United States Patent [19]

Lamm et al.

[11] Patent Number: 5,470,959
[45] Date of Patent: Nov. 28, 1995

[54] POLYAZO DYES HAVING A DIAZO COMPONENT OF THE AMINOBENZOPHENONE SERIES

[75] Inventors: Gunther Lamm, Hassloch; Udo Mayer, Frankenthal; Helmut Reichelt, Neustadt; Georg Zeidler, Dannstadt-Schauernheim, all of Germany

[73] Assignee: BASF Aktiengesellschaft, Ludwigshafen, Germany

[21] Appl. No.: 185,235

[22] Filed: Jan. 24, 1994

Related U.S. Application Data

[63] Continuation of Ser. No. 988,756, Dec. 10, 1992, abandoned.

[30] Foreign Application Priority Data

Dec. 21, 1991 [DE] Germany ............ 41 42 696.7

[51] Int. Cl.⁶ .................. C09B 45/24; C09B 33/02; C09B 33/24; C06P 3/32
[52] U.S. Cl. .................. 534/680; 534/684; 534/685; 534/688; 8/437
[58] Field of Search .................. 534/680, 684, 534/685, 688

[56] References Cited

U.S. PATENT DOCUMENTS

| | | | |
|---|---|---|---|
| 2,045,090 | 6/1936 | Lange et al. | 534/684 X |
| 2,183,673 | 12/1939 | Dobler et al. | 534/684 |
| 2,204,230 | 6/1940 | Rossander et al. | 534/684 X |
| 2,438,754 | 3/1948 | Krebser et al. | 534/684 |
| 3,406,160 | 10/1968 | Wicki | 534/680 X |
| 3,787,387 | 1/1974 | Wicki | 534/684 |
| 3,975,369 | 8/1976 | Wicki | 534/684 |
| 4,120,854 | 10/1978 | Wicki | 534/680 X |
| 4,263,229 | 4/1981 | Studer et al. | 534/688 X |
| 4,424,152 | 1/1984 | Mennicke et al. | 534/688 X |
| 4,563,520 | 1/1986 | Bergmann et al. | 534/680 X |
| 5,104,979 | 4/1992 | Hansen et al. | 534/688 X |
| 5,153,356 | 10/1992 | Lamm et al. | 562/46 |

FOREIGN PATENT DOCUMENTS

| | | |
|---|---|---|
| 0045868 | 2/1982 | European Pat. Off. . |
| 140252 | 5/1985 | European Pat. Off. ............ 534/688 |
| 0355601 | 2/1990 | European Pat. Off. . |
| 0469399 | 2/1992 | European Pat. Off. . |
| 1111593 | 7/1961 | Germany . |
| 2024047 | 11/1970 | Germany . |
| 2038473 | 2/1971 | Germany . |
| 2162419 | 7/1973 | Germany . |
| 3428836 | 2/1985 | Germany . |
| 1365798 | 9/1974 | United Kingdom . |

*Primary Examiner*—Johann Richter
*Assistant Examiner*—Fiona T. Powers
*Attorney, Agent, or Firm*—Oblon, Spivak, McClelland, Maier & Neustadt

[57] ABSTRACT

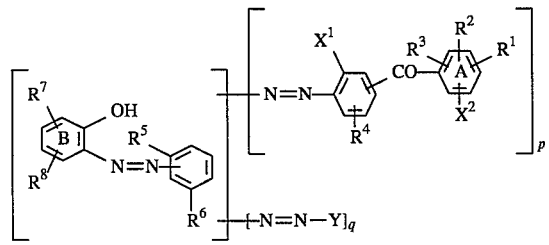

where p is from 1 to 2 and q is from 0 to 1 are useful in free form or as copper, chromium, iron, cobalt or nickel complexes for dyeing leather.

4 Claims, No Drawings

POLYAZO DYES HAVING A DIAZO COMPONENT OF THE AMINOBENZOPHENONE SERIES

This application is a continuation of application Ser. No. 07/988,756, filed on Dec. 10, 1992, now abandoned.

The present invention concerns novel polyazo dyes of the formula I

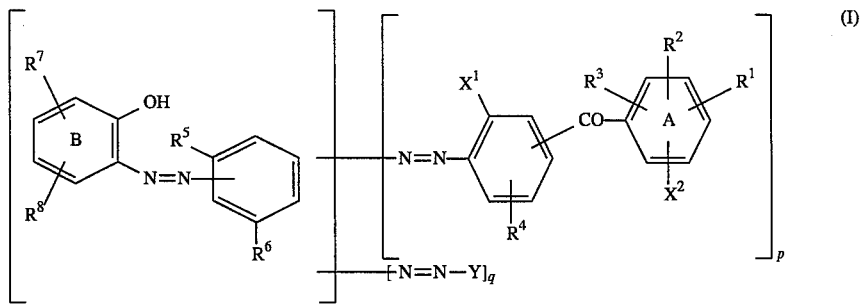

where
p is from 1 to 2,
q is from 0 to 1,
$X^1$ is hydrogen or hydroxysulfonyl,
$X^2$ is hydrogen, hydroxysulfonyl, hydroxysulfonylphenyl, hydroxysulfonylbenzyl or hydroxysulfonylphenylethyl,
$R^1$, $R^2$ and $R^3$ are identical or different and each is independently of the others hydrogen, halogen, $C_1$–$C_{12}$-alkyl, cyclohexyl or $C_1$–$C_4$-alkoxy,
$R^4$ is hydrogen, $C_1$–$C_4$-alkyl, $C_1$–$C_4$-alkoxy or chlorine,
$R^5$ and $R^6$ are identical or different and each is independently of the other hydroxyl or amino,
$R^7$ is hydrogen, $C_1$–$C_4$-alkyl, halogen, nitro, hydroxysulfonyl, sulfamoyl, $C_1$–$C_4$-mono- or -dialkylsulfamoyl, phenylsulfamoyl or $C_1$–$C_4$-alkylsulfonyl,
$R^8$ is hydrogen, halogen, nitro or hydroxysulfonyl, and
Y is a radical of the formula

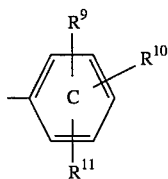

where
$R^9$ is hydrogen, hydroxyl, halogen, nitro or hydroxysulfonyl,
$R^{10}$ is hydrogen, halogen, nitro or hydroxysulfonyl, and
$R^{11}$ is hydrogen, $C_1$–$C_4$-alkyl, $C_1$–$C_4$-alkoxy or hydroxysulfonyl,
the ring A is optionally benzofused and a benzofused ring A can be bridged by $C_2H_4$ and the rings B and C can each be fused by an optionally nitro- or hydroxysulfonyl-substituted benzo ring, in free form or as copper, chromium, iron, cobalt or nickel complex, and the use of the novel dyes for dyeing leather.

CH-A-571 599, DE-A-2 024 047, DE-A-2 162 419 and EP-A-45 868 describe polyazo dyes which are similar to those of the formula I. However, instead of the carbonyl group these dyes contain an imino group. EP-A-355 601 also discloses similar polyazo dyes which instead of the carbonyl group have a sulfur-containing bridge member.

It is an object of the present invention to provide novel polyazo dyes which shall be easily obtainable and have advantageous application properties.

We have found that this object is achieved by the dyes of the abovementioned formula I.

Any alkyl appearing in the compounds of the invention can be either straight-chain or branched.

$R^1$, $R^2$, $R^3$, $R^4$ and $R^{11}$ are each for example methoxy, ethoxy, propoxy, isopropoxy, butoxy, isobutoxy or sec-butoxy.

$R^1$, $R^2$, $R^3$, $R^4$ and $R^{11}$ may each also be for example, as is $R^7$, methyl, ethyl, propyl, isopropyl, butyl, isobutyl or sec-butyl.

$R^1$, $R^2$, $R^3$ and $R^7$ may each also be for example, as is each of $R^8$, $R^9$ and $R^{10}$, fluorine, chlorine or bromine. Of these, chlorine or bromine is preferred.

$R^1$, $R^2$ and $R^3$ may each also be for example pentyl, isopentyl, neopentyl, tert-pentyl, hexyl, 2-methylpentyl, heptyl, 2-methylhexyl, octyl, isooctyl, 2-ethylhexyl, nonyl, isononyl, decyl, isodecyl, undecyl or dodecyl (the above designations isooctyl, isononyl and isodecyl are trivial names derived from the oxo process alcohols - cf. Ullmanns Encyklopädie der technischen Chemie, 4th edition, volume 7, pages 215 to 217, and also volume 11, pages 435 and 436).

$R^7$ may also be for example mono- or dimethylsulfamoyl, mono- or diethylsulfamoyl, mono- or dipropylsulfamoyl, mono- or diisopropylsulfamoyl, mono- or dibutylsulfamoyl, N-methyl-N-ethylsulfamoyl, methylsulfonyl, ethylsulfonyl, propylsulfonyl, isopropylsulfonyl or butylsulfonyl.

The indices p and q may each also be fractions of integers, in which case mixtures of polyazodyes are present.

It will be readily understood that, if the polyazo dyes of the formula I contain one or more hydroxysulfonyl groups, the salts thereof are also to be encompassed by the invention.

The salts envisioned here are metal or ammonium salts. Metal salts are in particular the lithium, sodium or potassium salts. Ammonium salts for the purposes of the present invention are those salts which have either substituted or unsubstituted ammonium cations. Substituted ammonium cations are for example monoalkyl-, dialkyl-, trialkyl-, tetraalkyl- or benzyltrialkylammonium cations or those cations which are derived from nitrogen-containing 5- or 6-membered saturated heterocycles, such as pyrrolidinium, piperidinium, morpholinium, piperazinium or N-alkylpiperazinium cations or their N-monoalkyl- or N,N-dialkyl-substituted products. Alkyl as used herein is to be understood as meaning in general straight-chain or branched $C_1$–$C_{20}$-alkyl, which can be substituted by hydroxyl groups and/or interrupted by from 1 to 4 oxygen atoms in either function.

Preference is given to polyazo dyes of the formula I where q is 0,
$X^1$ is hydrogen or hydroxysulfonyl,
$X^2$ is hydrogen or hydroxysulfonyl,
$R^1$, $R^2$ and $R^3$ are each independently of the others hydrogen, halogen, $C_1$–$C_6$-alkyl, cyclohexyl or $C_1$–$C_4$-alkoxy,
$R^4$ is hydrogen, and
the ring A is not benzofused.

Preference is further given to polyazo dyes of the formula I in which one of the two radicals $X^1$ and $X^2$ is hydrogen and the other is hydroxysulfonyl.

Of importance are aminobenzophenones of the formula I where $R^1$, $R^2$ and $R^3$ are each independently of the others hydrogen, chlorine, $C_1$–$C_4$-alkyl, especially methyl or ethyl, methoxy or ethoxy.

Of particular importance are polyazo dyes of the formula Ia

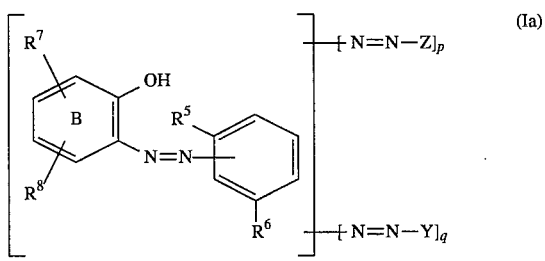

where Z is a radical of the formula IIa

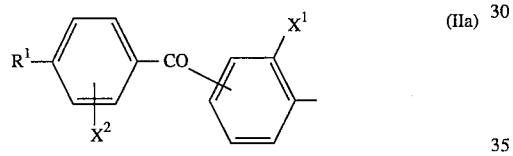

where one of the radicals $X^1$ and $X^2$ is hydrogen and the other is hydroxysulfonyl and $R^1$ is chlorine, $C_1$–$C_4$-alkyl, in particular methyl or ethyl, methoxy or ethoxy and where the carbonyl group is para to $X^1$ or to the azo group.

Of particular importance are also polyazo dyes of the formula Ia where Z is a radical of the formula IIb or IIc

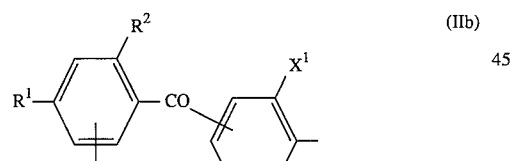

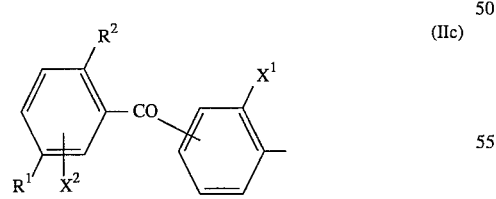

where one of the radicals $X^1$ and $X^2$ is hydrogen and the other is hydroxysulfonyl and $R^1$ and $R^2$ are each independently of the other chlorine, $C_1$–$C_4$-alkyl, in particular methyl or ethyl, methoxy or ethoxy and where the carbonyl group is in each case para to $X^1$ or to the azo group.

Also of commercial interest are the copper, chromium, iron or cobalt complexes of the polyazo dyes of the formula I, in particular the iron or chromium complexes.

The polyazo dyes of the invention are obtainable by methods known per se.

One possible method is to diazotize an aminophenol of the formula III

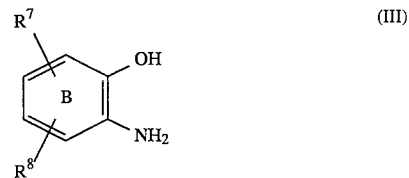

where $R^7$, $R^8$ and the ring B are each as defined above, and couple the diazonium salt with a coupling component of the formula IV

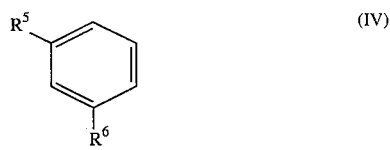

where $R^5$ and $R^6$ are each as defined above, to form a monoazo compound of the formula V

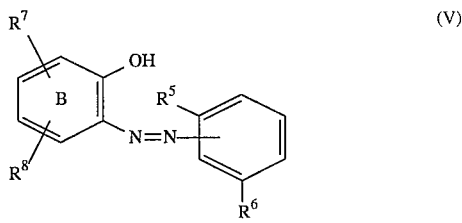

where $R^5$, $R^6$, $R^7$, $R^8$ and the ring B are each as defined above.

This may be followed by diazotizing an amino-benzophenone of the formula II

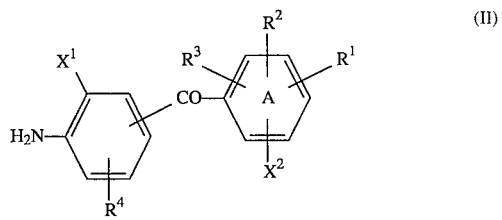

where $R^1$, $R^2$, $R^3$, $R^4$, $X^1$, $X^2$ and the ring A are each as defined above, and coupling the diazonium salt with the above-described monoazo compound V.

If desired, it is then possible to diazotize an amine of the formula VI

Y—NH₂ (VI)

where Y is as defined above, and couple the diazonium salt with the disazo dye of the formula I (where q=0).

This example of a possible method of preparation is not of course obligatory; that is, it is also possible to vary the order in which the coupling reactions are carried out. For example, the aminobenzophenone II may be diazotized first and coupled with the coupling component IV and the resulting reaction product then coupled with the aminophenol III, previously diazotized.

The metallization, i.e. the preparation of the respective copper, chromium, iron, cobalt or nickel complexes, of the polyazo dyes I is likewise effected by methods known per se. For example, by treatment of the polyazo dye with the corresponding metal salts, for example with iron(III) chloride, iron(II) sulfate, copper sulfate or chromium(III) formate, in aqueous solution at from 80° to 105° C. and at pH 4–6.

The aminophenols III and the coupling component IV are compounds known per se. The aminobenzophenones are described in the earlier Patent Application EP-A-469,399.

There follow some examples of aminobenzophenones of the formula II and suitable aminophenol derivatives of the formula III.

Aminobenzophenones of the formula II are for example

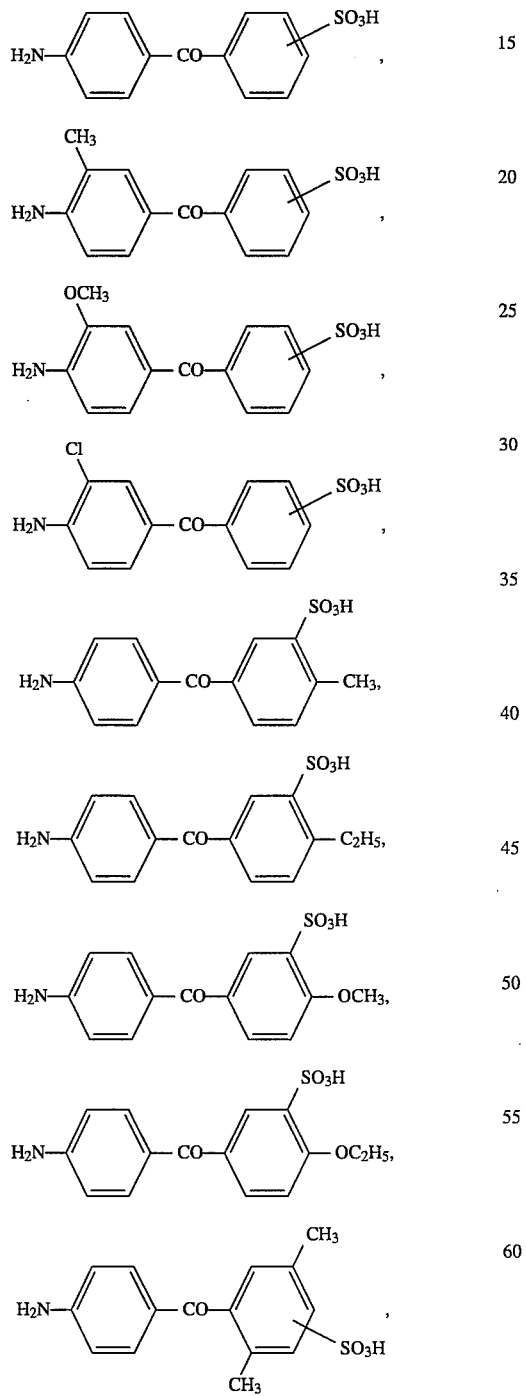

-continued

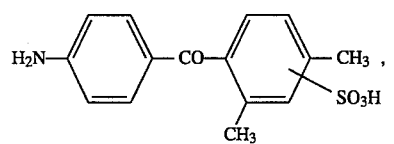

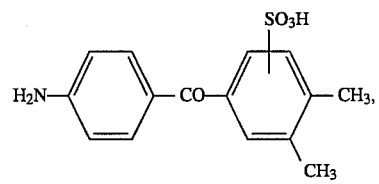

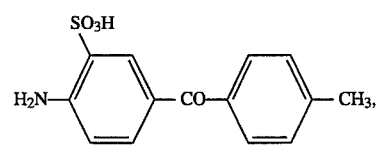

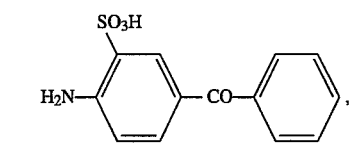

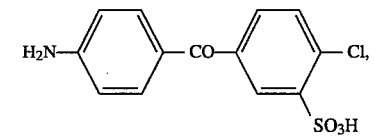

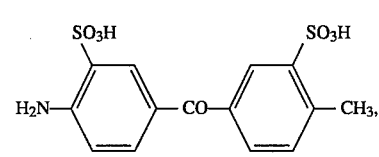

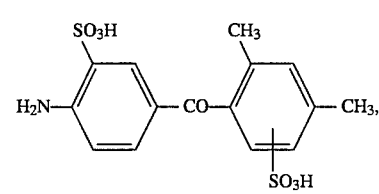

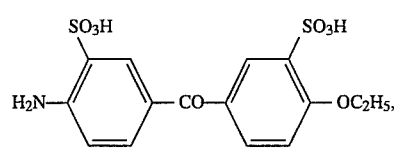

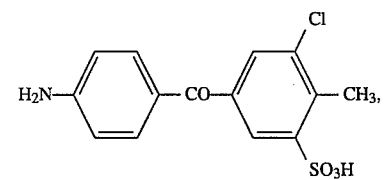

-continued
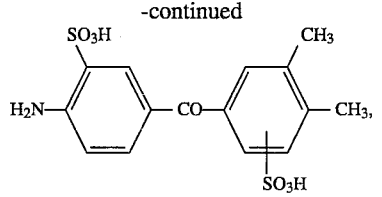
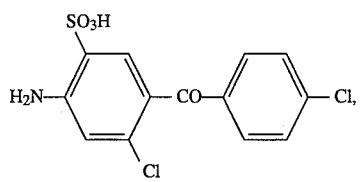
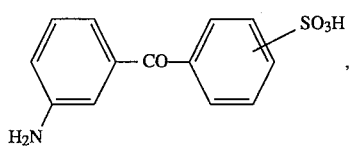
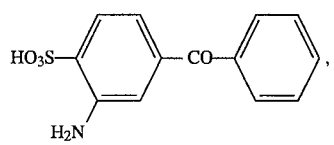
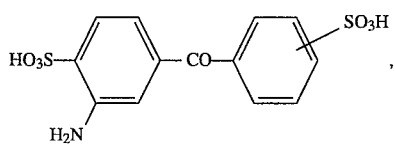
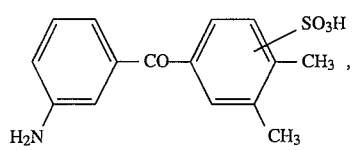
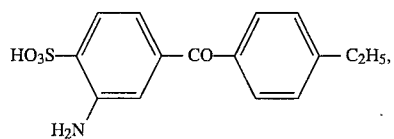
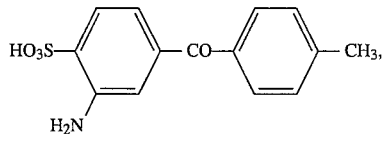
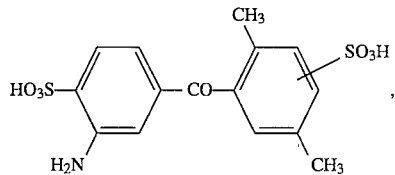
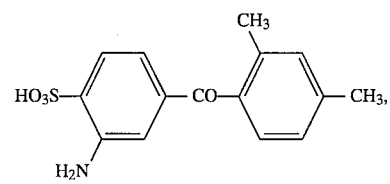
-continued
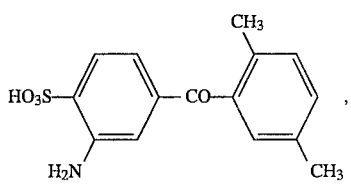
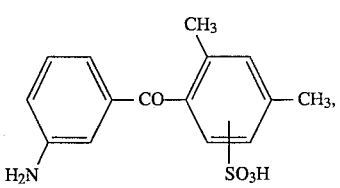
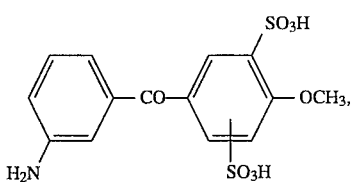
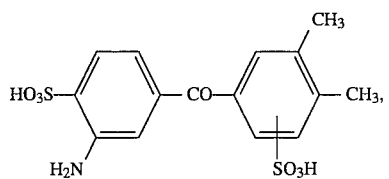
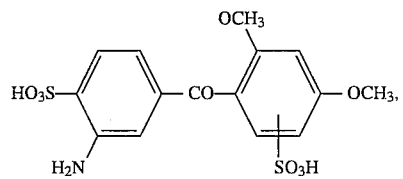
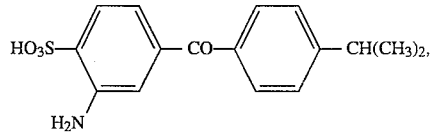
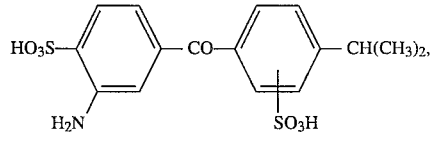
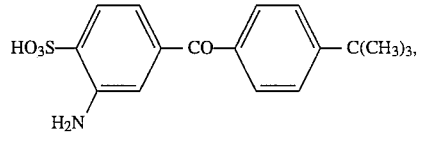
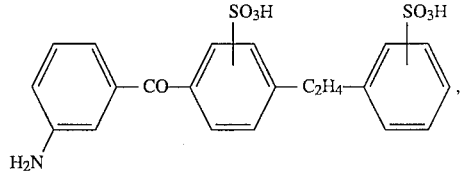

-continued
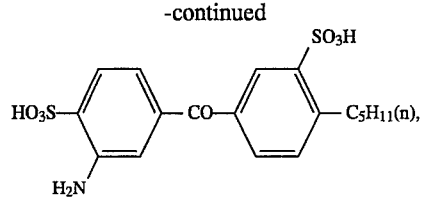
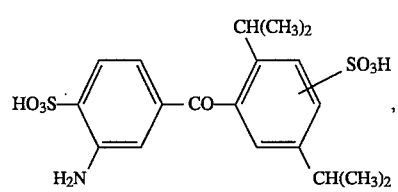
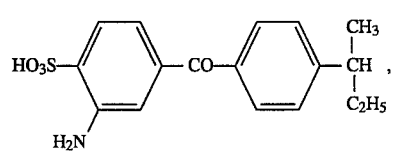
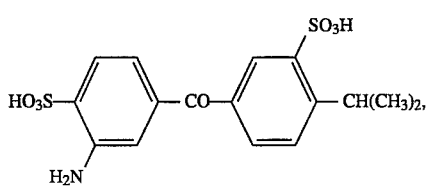
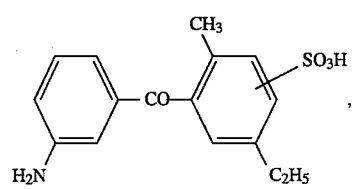
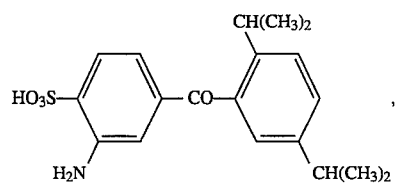
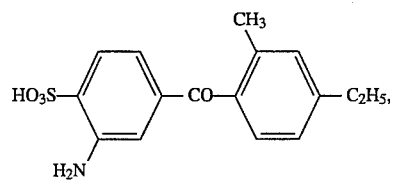
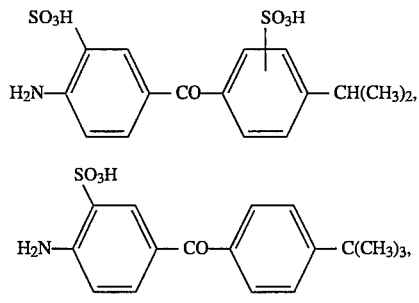
-continued
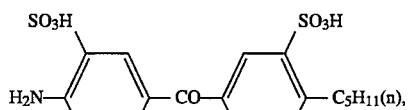
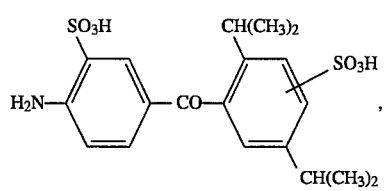
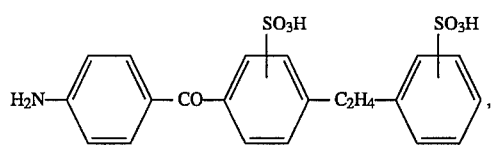
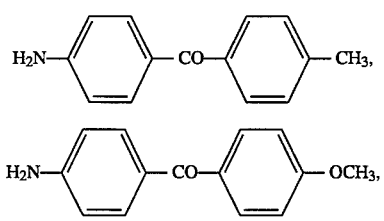
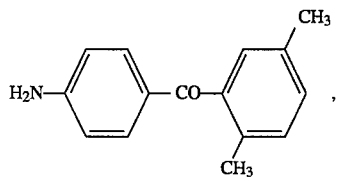
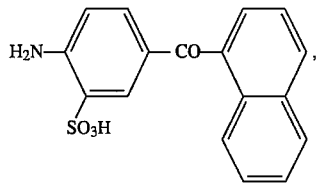
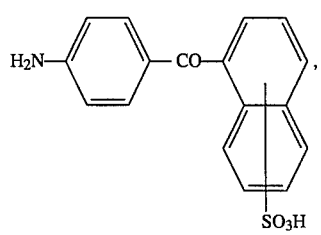
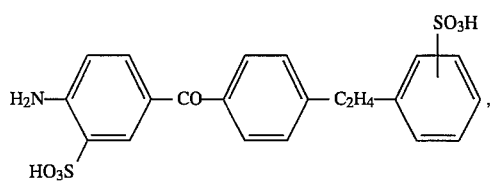

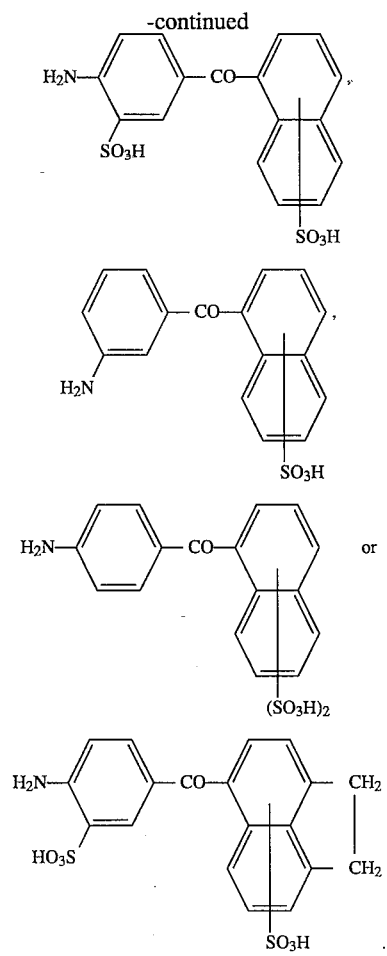
Aminophenols of the formula III are for example
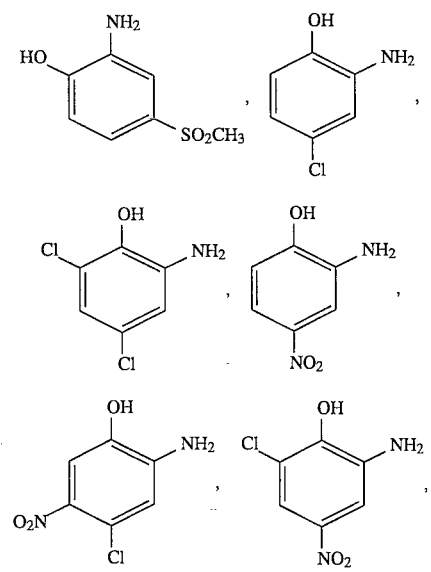
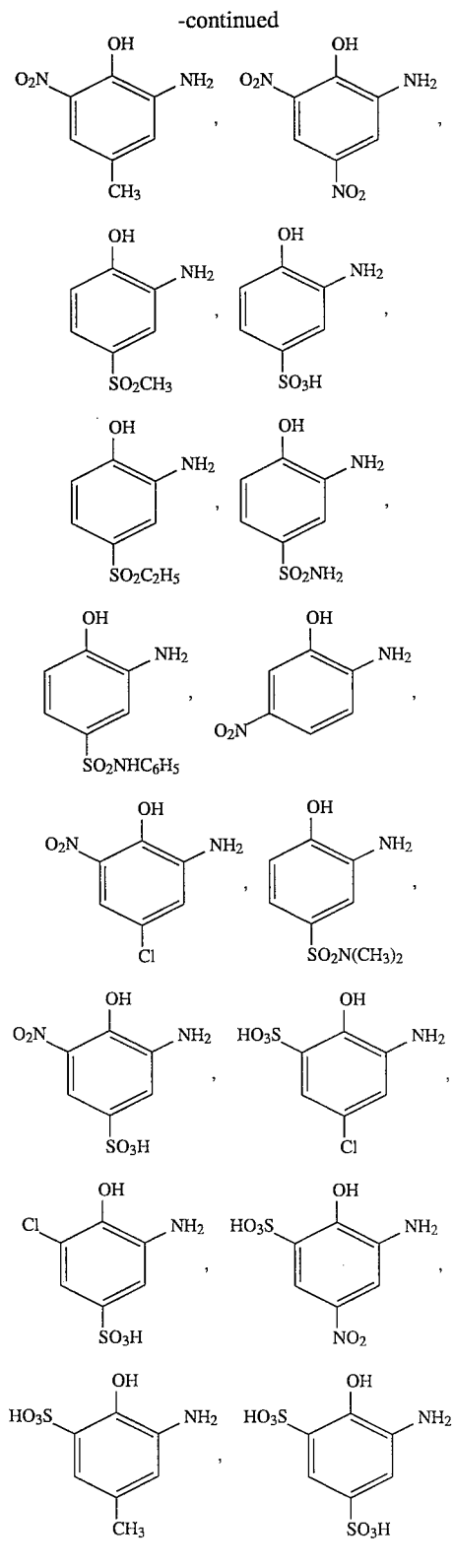

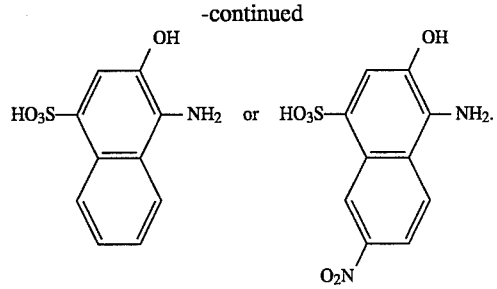

The polyazo dyes of the invention are advantageous for dyeing leather.

The invention will now be more particularly described by means of examples. The percentages mentioned are by weight.

EXAMPLE 1

19.9 g of 1-amino-2-hydroxy-3,5-dinitrobenzene were conventionally diazotized and coupled under alkaline conditions with 11 g of resorcinol. Then the diazonium salt of 29.1 g of 4-amino-4'-methylbenzophenone- 3'-sulfonic acid was added to the suspension at pH 8–9. After the coupling had ended, the reaction mixture was adjusted to pH 5 with acetic acid, admixed with 38 g of anhydrous iron(III) chloride and heated at pH 4–5 to 90°–95° C. for about 3 hours.

The metallization was followed by the addition of sodium chloride to precipitate the dye, which was then isolated and dried. The iron complex of the compound of the formula

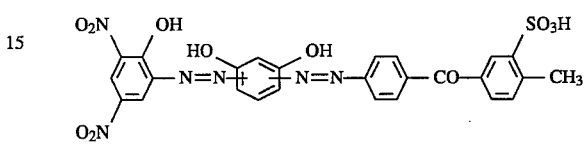

dyes leather in light- and wet-fast yellowish brown shades.

The dyes listed below in the tables are obtained in a similar manner.

TABLE 1

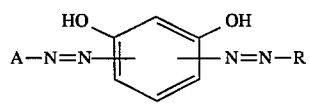

| | | | Hue of dyeing of metal complexes on leather | | | | |
|---|---|---|---|---|---|---|---|
| Ex. No. | A | R | Cu | Cr | Co | Ni | Fe |
| 2 | O₂N, OH, O₂N (2,4-dinitrophenol) | —C₆H₄—CO—C₆H₃(SO₃H)(OCH₃) | reddish brown | | | reddish brown | |
| 3 | O₂N, OH, O₂N (2,4-dinitrophenol) | —C₆H₄—CO—C₆H₃(SO₃H)(OC₂H₅) | | reddish brown | | | yellowish brown |
| 4 | Cl, OH, O₂N | —C₆H₄—CO—C₆H₂(SO₃H)(CH₃)(CH₃) | brown | | | reddish brown | yellowish brown |
| 5 | Cl, OH, O₂N | —C₆H₃(SO₃H)—CO—C₆H₃(SO₃H)(OC₂H₅) | reddish brown | | brown | | yellowish brown |

TABLE 1-continued $$\text{A—N=N—}\underset{\underset{\text{OH}}{|}}{\overset{\overset{\text{HO}}{|}}{\bigcirc}}\text{—N=N—R}$$

| | | | Hue of dyeing of metal complexes on leather | | | | |
|---|---|---|---|---|---|---|---|
| Ex. No. | A | R | Cu | Cr | Co | Ni | Fe |
| 6 | 2,4-dichloro-6-hydroxyphenyl (Cl, OH, Cl) | 4-(4-methyl-3-sulfobenzoyl)phenyl | brown | | | | yellowish brown |
| 7 | 2-hydroxy-5-nitrophenyl | 4-(4-methyl-3-sulfobenzoyl)phenyl | | reddish brown | | | yellowish brown |
| 8 | 2-hydroxy-3-nitro-5-chlorophenyl | 4-(4-ethyl-3-sulfobenzoyl)phenyl | reddish brown | | | | yellowish brown |
| 9 | 2-hydroxy-5-chlorophenyl | 4-(4-ethyl-3-sulfobenzoyl)phenyl | reddish brown | reddish brown | | | |
| 10 | 2-hydroxy-5-sulfophenyl (OH, HO$_3$S) | 4-(4-methyl-3-sulfobenzoyl)phenyl | reddish brown | | | | yellowish brown |
| 11 | 2-hydroxy-5-sulfamoylphenyl (OH, SO$_2$NH$_2$) | 4-(4-methoxy-3-sulfobenzoyl)phenyl | brown | | brown | | yellowish brown |
| 12 | 2-hydroxy-5-(N,N-dimethylsulfamoyl)phenyl (OH, SO$_2$N(CH$_3$)$_2$) | 4-(4-methyl-3-sulfobenzoyl)-2-sulfophenyl | | reddish brown | | | yellowish brown |

TABLE 1-continued
| | | | Hue of dyeing of metal complexes on leather | | | | |
|---|---|---|---|---|---|---|---|
| Ex. No. | A | R | Cu | Cr | Co | Ni | Fe |
| 13 | 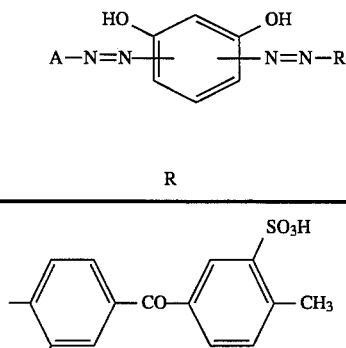 | 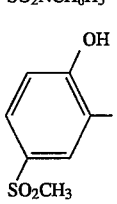 | | brown | | | yellowish brown |
| 14 | 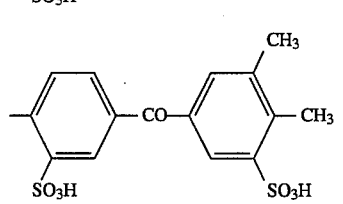 | 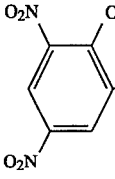 | reddish brown | reddish brown | | | yellowish brown |
| 15 | 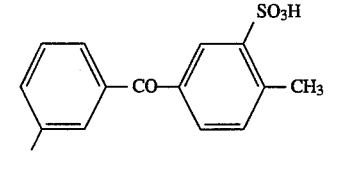 | 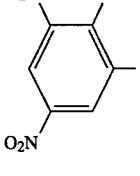 | | reddish brown | reddish brown | | yellowish brown |
| 16 | 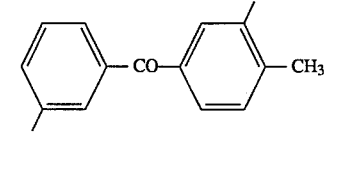 | 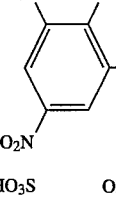 | reddish brown | reddish brown | | | yellowish brown |
| 17 | 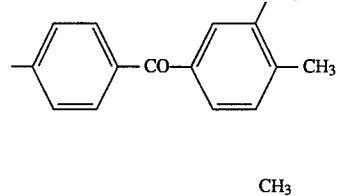 | 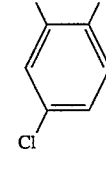 | reddish brown | | | | yellowish brown |
| 18 | 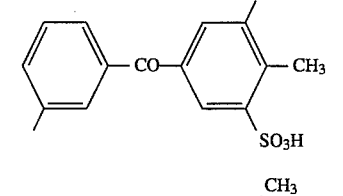 | 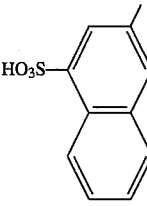 | | reddish brown | | | yellowish brown |
| 19 | 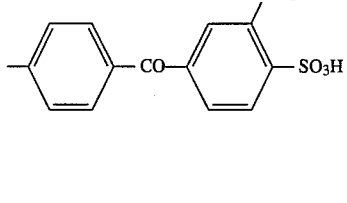 | | | | | reddish brown | |

TABLE 1-continued
$$A-N=N-\underset{\underset{OH}{\mid}}{\overset{\overset{HO}{\mid}}{\bigcirc}}-N=N-R$$
| | | | Hue of dyeing of metal complexes on leather | | | | |
|---|---|---|---|---|---|---|---|
| Ex. No. | A | R | Cu | Cr | Co | Ni | Fe |
| 20 | 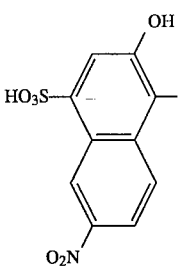 | 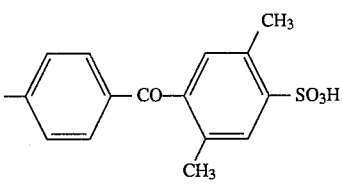 | reddish brown | | | brown | |
| 21 | 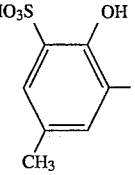 | 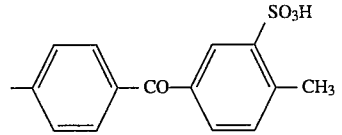 | reddish brown | | | | brown |
| 22 | 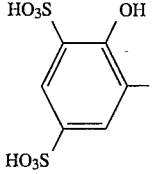 | 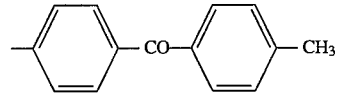 | | | reddish brown | | brown |
| 23 | 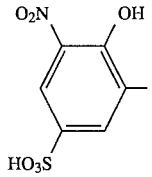 | 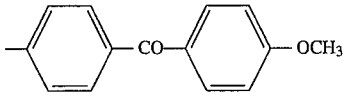 | reddish brown | | | | yellowish brown |
| 24 | 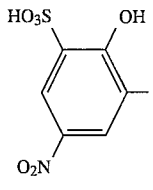 | 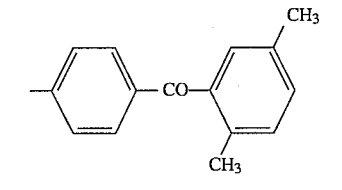 | reddish brown | | | | yellowish brown |
| 25 | 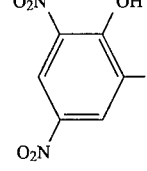 | 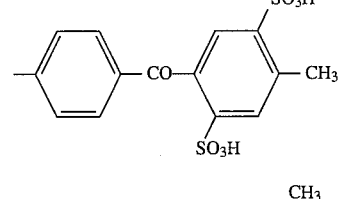 | reddish brown | | | reddish brown | |
| 26 | 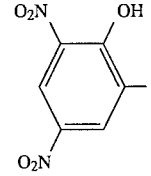 | 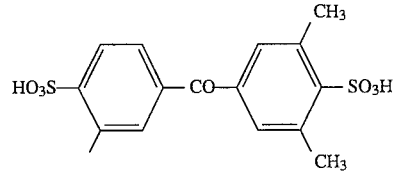 | reddish brown | | | | yellowish brown |

TABLE 1-continued $$A-N=N-\underset{\underset{HO}{|}}{\bigcirc}-\underset{\underset{OH}{|}}{\bigcirc}-N=N-R$$

| | | | Hue of dyeing of metal complexes on leather | | | | |
|---|---|---|---|---|---|---|---|
| Ex. No. | A | R | Cu | Cr | Co | Ni | Fe |
| 27 | 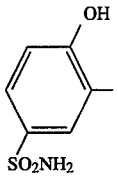 | 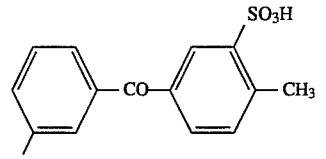 | | reddish brown | | | yellowish brown |
| 28 | 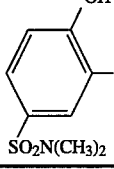 | 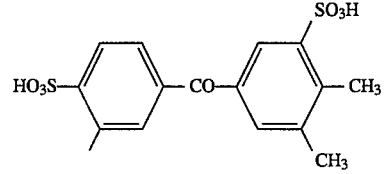 | | reddish brown | | | yellowish brown |

TABLE 2

| | | | Hue of dyeing of metal complexes on leather | | | | |
|---|---|---|---|---|---|---|---|
| Ex. No. | A | R | Cu | Cr | Co | Ni | Fe |
| 29 | 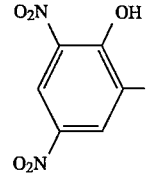 | 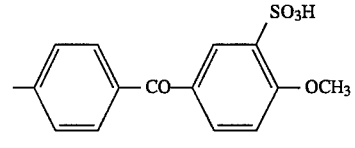 | reddish brown | | | | yellowish brown |
| 30 | 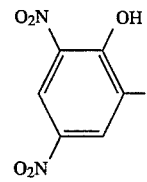 | 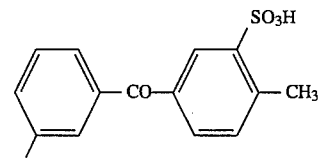 | | reddish brown | | | yellowish brown |
| 31 | 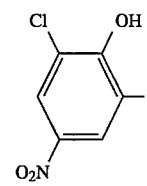 | 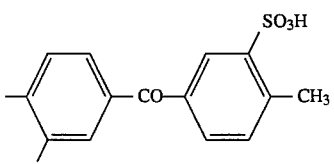 | | reddish brown | | reddish brown | |
| 32 | 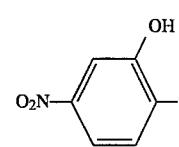 | 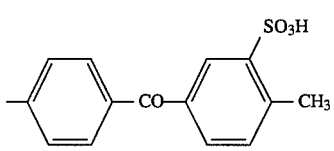 | reddish brown | | reddish brown | | brown |
| 33 | 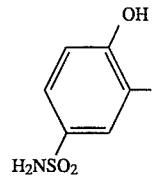 | 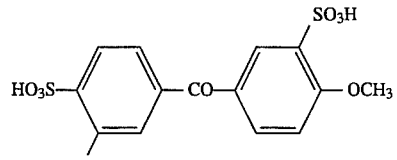 | | reddish brown | | | yellowish brown |

TABLE 2-continued

| Ex. No. | A | R | Hue of dyeing of metal complexes on leather | | | | |
|---|---|---|---|---|---|---|---|
| | | | Cu | Cr | Co | Ni | Fe |
| 34 | 2-Cl, 4-SO₃H, 6-HO₃S phenol (with OH) | 4-[CO-(3-SO₃H-4-CH₃-phenyl)]phenyl | reddish brown | | | | brown |
| 35 | 2-HO₃S, 4-O₂N, 6-substituted phenol | 4-[CO-(2,5-diCH₃-4-SO₃H-phenyl)]phenyl | reddish brown | reddish brown | | | |
| 36 | 2-HO₃S, 4-CH₃, 6-substituted phenol | 4-[CO-(3-SO₃H-4-OCH₃-phenyl)]phenyl | reddish brown | | | | brown |
| 37 | 2,4-diO₂N, 6-substituted phenol | 3-HO₃S-4-[CO-(2,5-diCH₃-4-CH₃-phenyl)]phenyl | reddish brown | | | | yellowish brown |
| 38 | 2,4-diO₂N, 6-substituted phenol | 3-HO₃S-4-[CO-(3-CH₃-5-CH₃-2-SO₃H-phenyl)]phenyl | reddish brown | | | | yellowish brown |
| 39 | 2-Cl, 4-O₂N, 6-substituted phenol | 3-HO₃S-4-[CO-(3-CH₃-4-SO₃H-phenyl)]phenyl | reddish brown | reddish brown | | | |
| 40 | 4-SO₂NHC₆H₅ phenol | 3-SO₃H-4-[CO-(3-SO₃H-4-CH₃-phenyl)]phenyl | reddish brown | | | | yellowish brown |
| 41 | 4-O₂N phenol | 4-[CO-(3-HO₃S-5-CH₃-phenyl)...4-CH₃ SO₃H phenyl] | reddish brown | | | | yellowish brown |

TABLE 2-continued

| Ex. No. | A | R | Cu | Cr | Co | Ni | Fe |
|---|---|---|---|---|---|---|---|
| 42 | HO₃S, OH, O₂N substituted benzene | CH₃, SO₃H, CH₃ substituted benzophenone | | | reddish brown | | yellowish brown |

TABLE 3

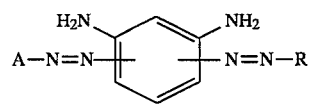

| Ex. No. | A | R | Cu | Cr | Co | Ni | Fe |
|---|---|---|---|---|---|---|---|
| 43 | O₂N, OH, O₂N substituted benzene | SO₃H, CH₃ substituted benzophenone | reddish brown | | | | yellowish brown |
| 44 | HO₃S, OH, O₂N substituted benzene | SO₃H, CH₃ substituted benzophenone | | reddish brown | | | brown |
| 45 | HO₃S, OH, Cl substituted benzene | SO₃H, CH₃ substituted benzophenone (with CH₃) | | | | reddish brown | |
| 46 | OH, O₂N substituted benzene | SO₃H, CH₃, HO₃S, CH₃ substituted benzophenone | reddish brown | | | | |
| 47 | OH, SO₂NH₂ substituted benzene | SO₃H, CH₃, SO₃H substituted benzophenone | | brown | | | yellowish brown |

TABLE 3-continued $$A-N=N-\underset{\underset{NH_2}{|}}{\underset{H_2N}{|}}{\bigcirc}-N=N-R$$

| | | | Hue of dyeing of metal complexes on leather | | | | |
|---|---|---|---|---|---|---|---|
| Ex. No. | A | R | Cu | Cr | Co | Ni | Fe |
| 48 | 2-Cl, 4-O$_2$N, 6-(attachment), 1-OH phenyl | 4-(attachment)-3-SO$_3$H-benzoyl-4'-CH$_3$-3'-SO$_3$H-phenyl | | | reddish brown | | yellowish brown |
| 49 | 2-H$_3$C, 4-O$_2$N, 6-(attachment), 1-OH phenyl | 4-(attachment)-3-SO$_3$H-benzoyl-4'-OCH$_3$-3'-SO$_3$H-phenyl | reddish brown | | | reddish brown | |
| 50 | 4-CH$_3$SO$_2$, 1-OH, 2-(attachment) phenyl | 4-(attachment)-3-SO$_3$H-benzoyl-4'-OC$_2$H$_5$-3'-SO$_3$H-phenyl | | | reddish brown | | yellowish brown |
| 51 | 4-HO$_3$S, 1-OH, 2-(attachment) phenyl | 4-(attachment)-benzoyl-4'-CH$_3$-3'-SO$_3$H-phenyl | reddish brown | reddish brown | | | yellowish brown |
| 52 | 3-HO$_3$S, 5-HO$_3$S, 1-OH, 2-(attachment) phenyl | 4-(attachment)-benzoyl-phenyl | | | reddish brown | | yellowish brown |
| 53 | 4-H$_2$NSO$_2$, 1-OH, 2-(attachment) phenyl | 4-(attachment)-3-SO$_3$H-benzoyl-2',5'-(CH$_3$)$_2$-4'-SO$_3$H-phenyl | reddish brown | | | reddish brown | yellowish brown |
| 54 | 2-O$_2$N, 4-HO$_3$S, 1-OH, 6-(attachment) phenyl | 4-(attachment)-3-SO$_3$H-benzoyl-3',4'-(CH$_3$)$_2$-phenyl | reddish brown | | | | yellowish brown |

TABLE 3-continued

A—N=N—[benzene ring with H₂N, NH₂]—N=N—R

| | | | Hue of dyeing of metal complexes on leather | | | | |
|---|---|---|---|---|---|---|---|
| Ex. No. | A | R | Cu | Cr | Co | Ni | Fe |
| 55 | [2-hydroxyphenyl, OH] | [phenyl-CO-phenyl with SO₃H, CH₃, SO₃H] | reddish brown | | | | yellowish brown |
| 56 | [4-hydroxy-3-sulfophenyl, OH, HO₃S] | [phenyl-CO-phenyl with SO₃H, CH₃] | | reddish brown | | | brown |
| 57 | [2,4-dinitro-6-hydroxyphenyl, O₂N, OH, O₂N] | [phenyl-CO-naphthyl with SO₃H, SO₃H] | | | | | brown |

EXAMPLE 58

19.9 g of 1-amino-2-hydroxy-3,5-dinitrobenzene were conventionally diazotized and coupled under alkaline conditions with 11 g of resorcinol. Then the diazonium salt of 29.1 g of 4-amino-4'-methylbenzophenone-3'-sulfonic acid was added to the suspension at pH 8–9. After the formation of the disazo dye was complete, the diazo compound of 21.8 g of 1-amino-4-nitrobenzene-2-sulfonic acid was added in such a way that coupling took place at a pH between 6 and 7. After the coupling reaction had ended, the reaction mixture was adjusted to pH 5 with acetic acid and complexed with anhydrous iron(III) chloride as described in Example 1.

The metallization was followed by the addition of sodium chloride to precipitate the dye, which was then isolated and dried. The iron complex of the compound of the formula

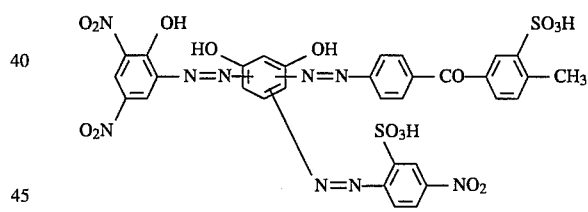

dyes vegetable/synthetically retanned chrome cattlehide leather in light- and wet-fast brown shades.

The dyes listed below in the table are obtained in a similar manner.

TABLE 4
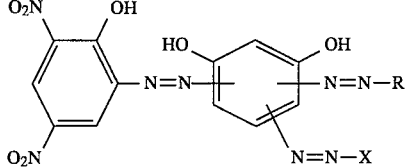
| Ex. No. | R | X | Hue of Fe complex on leather |
|---|---|---|---|
| 59 | 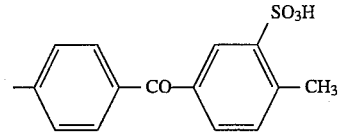 | 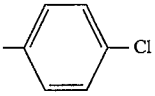 | yellowish brown |
| 60 | 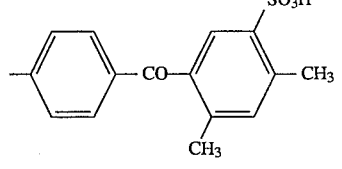 | 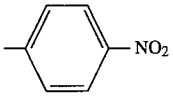 | brown |
| 61 | 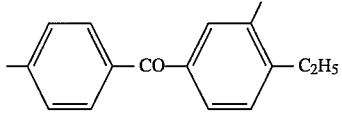 | 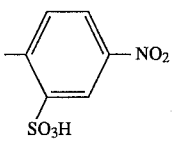 | yellowish brown |
| 62 | 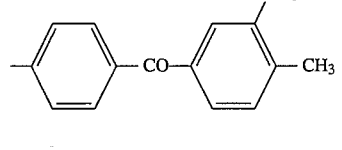 | 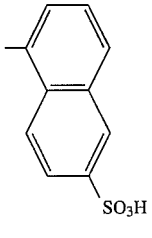 | brown |
| 63 | 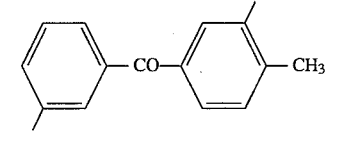 | 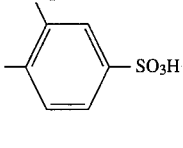 | reddish brown |
| 64 | 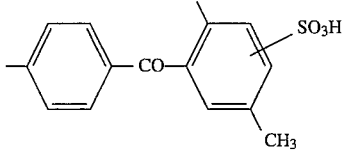 | 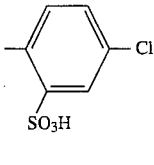 | brown |
| 65 | 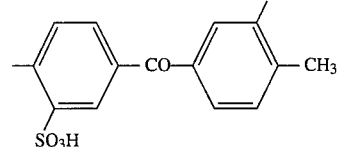 | 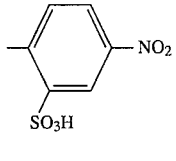 | brown |
| 66 | 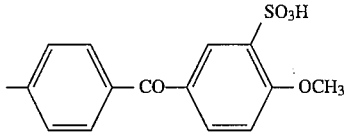 | 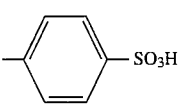 | brown |

TABLE 4-continued

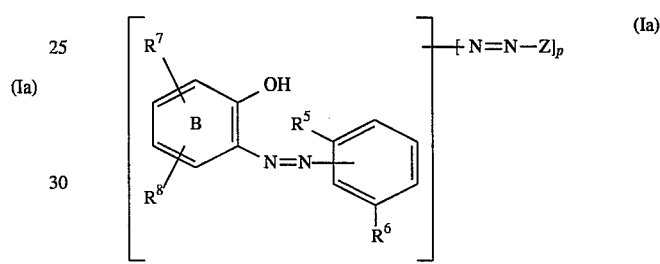

| Ex. No. | R | X | Hue of Fe complex on leather |
|---|---|---|---|
| 67 | 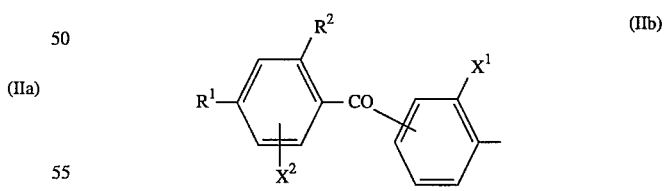 | 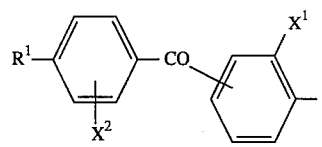 (phenyl) | brown |

We claim:

1. A polyazo dye of the formula (Ia)

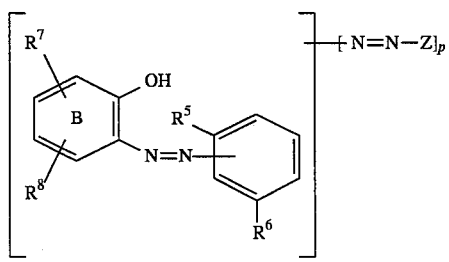

where p is from 1 to 2, $R^5$ and $R^6$, identical or different, are hydroxyl or amino;

$R^7$ is hydrogen, $C_{1-4}$ alkyl, halogen, nitro, hydroxsulfonyl, sulfamoyl, $C_{1-4}$-mono- or -dialkylsulfamoyl, phenylsulfamoyl or $C_{1-4}$-alkylsulfonyl;

$R^8$ is hydrogen, halogen, nitro or hydroxysulfonyl;

the ring B can be fused by an optionally nitro- or hydroxysulfonyl-substituted benzo ring, in free form or as a copper, chromium, iron, cobalt or nickel complex;

and Z is a radical of the formula (IIa)

$$\text{(IIa)}$$

where one of the radicals $X^1$ and $X^2$ is hydrogen and the other is hydroxysulfonyl;

$R^1$ is chlorine or $C_{1-4}$-alkyl; and the carbonyl group of the radical (IIa) is para to $X^1$ or to the azo group.

2. A polyazo dye of the formula (Ia)

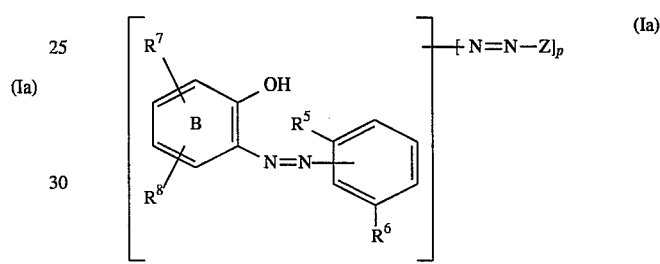

where p is from 1 to 2, $R^5$ and $R^6$, identical or different, are hydroxyl or amino;

$R^7$ is hydrogen, $C_{1-4}$ alkyl, halogen, nitro, hydroxysulfonyl, sulfamoyl, $C_{1-4}$-mono- or -dialkylsulfamoyl, phenylsulfamoyl or $C_{1-4}$-alkylsulfonyl;

$R^8$ hydrogen, halogen, nitro or hydroxysulfonyl;

the ring B can be fused by an optionally nitro- or hydroxysulfonyl-substituted benzo ring, in free form or as a copper, chromium, iron, cobalt or nickel complex;

and Z is a radical of the formula (IIb)

$$\text{(IIb)}$$

where one of the radicals $X^1$ and $X^2$ is hydrogen and the other is hydroxysulfonyl;

$R^1$ and $R^2$, the same or different, are chlorine or $C_{1-4}$-alkyl; and the carbonyl group of the radical (IIb) is para to $X^1$ or to the azo group.

3. A polyazo dye of the formula (Ia)

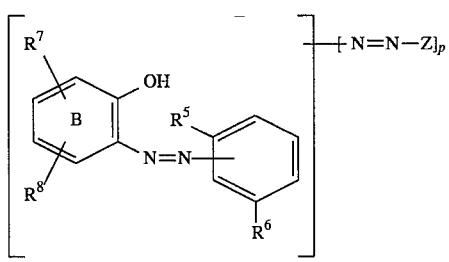 (Ia)

where p is from 1 to 2, $R^5$ and $R^6$, identical or different, are hydroxyl or amino;

$R^7$ is hydrogen, $C_{1-4}$ alkyl, halogen, nitro, hydroxysulfonyl, sulfamoyl, $C_{1-4}$-mono- or -dialkylsulfamoyl, phenylsulfamoyl or $C_{1-4}$-alkylsulfonyl;

$R^8$ is hydrogen, halogen, nitro or hydroxysulfonyl;

the ring B can be fused by an optionally nitro- or hydroxysulfonyl-substituted benzo ring, in free form or as copper, chromium, iron, cobalt or nickel complex;

and Z is a radical of the formula (IIc)

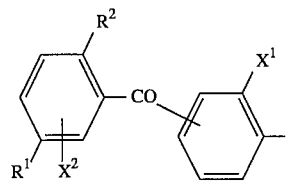 (IIc)

where one of the radicals $X^1$ and $X^2$ is hydrogen and the other is hydroxysulfonyl;

$R^1$ and $R^2$, the same or different, are chlorine or $C_{1-4}$-alkyl; and the carbonyl group of the radical (IIc) is para to $X^1$ or to the azo group.

4. A method of dyeing leather comprising applying thereto a polyazo dye of claim 1.

* * * * *